US010636257B1

(12) United States Patent
Lee et al.

(10) Patent No.: US 10,636,257 B1
(45) Date of Patent: Apr. 28, 2020

(54) AUTOMATED TELLER MACHINE WITH HAND LOCATION DETECTION

(71) Applicant: Hyosung TNS Inc., Seoul (KR)

(72) Inventors: Young Chul Lee, Yongin-si (KR); Kyoung Soo Kim, Ansan-si (KR); Sang Kyu Lee, Incheon (KR); Jin Young Hwang, Seoul (KR)

(73) Assignee: Hyosung TNS Inc., Seoul (KR)

( * ) Notice: Subject to any disclaimer, the term of this patent is extended or adjusted under 35 U.S.C. 154(b) by 0 days.

(21) Appl. No.: 16/421,347

(22) Filed: May 23, 2019

(30) Foreign Application Priority Data

Oct. 29, 2018 (KR) .................. 10-2018-0129583

(51) Int. Cl.
*G07F 19/00* (2006.01)
*G06Q 20/10* (2012.01)
*G08B 21/18* (2006.01)

(52) U.S. Cl.
CPC ....... *G07F 19/202* (2013.01); *G06Q 20/1085* (2013.01); *G08B 21/18* (2013.01)

(58) Field of Classification Search
CPC ............... G06Q 20/1085; G07F 19/20; G07F 19/201–203; G07F 19/205; G07F 19/209
See application file for complete search history.

(56) References Cited

U.S. PATENT DOCUMENTS

| 6,731,778 B1* | 5/2004 | Oda ................... G06Q 20/1085 348/156 |
| 2004/0060980 A1* | 4/2004 | Shibata ................... G07F 19/20 235/381 |
| 2004/0164141 A1* | 8/2004 | Egami ..................... G07F 19/20 235/379 |
| 2008/0142583 A1* | 6/2008 | Yokoi ..................... G07F 19/20 235/379 |
| 2016/0253859 A1* | 9/2016 | Stapfer ................ G07F 19/207 348/150 |
| 2018/0033228 A1* | 2/2018 | Akagi ...................... B65B 5/00 |

* cited by examiner

*Primary Examiner* — Suezu Ellis
(74) *Attorney, Agent, or Firm* — Fenwick & West LLP

(57) ABSTRACT

Described herein relates to a deposit/withdrawal apparatus of an automated teller machine (ATM) and a control method thereof, and more particularly, relates to a deposit/withdrawal apparatus of ATM which is a deposit/withdrawal apparatus of a present type ATM which receives or discharges a bill by moving a tray for loading a bill forwards and backwards during a deposit/withdrawal transaction, and a control method thereof, in which the deposit/withdrawal apparatus is configured to include a tray for loading a bill, a clamp for fixing a bill, a shutter for opening or closing an entrance of a bill, and a camera mounted at one side of the bill insertion slot through which the tray enters, to determine an insertion status of a bill from an image photographed by the camera, and to control operations of the tray, the clamp, and the shutter.

10 Claims, 3 Drawing Sheets

AUTOMATED TELLER MACHINE WITH HAND LOCATION DETECTION

CROSS-REFERENCE TO RELATED APPLICATION

This application claims priority under 35 U.S.C. § 119(a) to Republic of Korea Patent Application No. 10-2018-0129583 filed on Oct. 29, 2018, which is incorporated by reference herein in its entirety.

BACKGROUND

1. Technical Field

The present disclosure relates to a deposit/withdrawal apparatus of an automated teller machine (ATM) and a control method thereof. More particularly, the present disclosure relates to a deposit/withdrawal apparatus of ATM which is a deposit/withdrawal apparatus of a present type ATM which receives or discharges a bill by moving a tray for loading a bill forwards and backwards during a deposit/withdrawal transaction, and a control method thereof, in which the deposit/withdrawal apparatus is configured to include a tray for loading a bill, a clamp for fixing a bill, a shutter for opening or closing an entrance of a bill, and a camera mounted at one side of a bill insertion slot through which the tray enters, to grasp an insertion situation of a bill from an image photographed by the camera, and to control operations of the tray, the clamp, and the shutter, thereby making it possible to effectively support the deposit/withdrawal transaction with a simple structure using the camera.

2. Related Art

An automated teller machine (ATM) is an automated instrument that can support basic financial services such as deposit/withdrawal without bank staffs any time and at any place in relation to financial services, and is configured so that users themselves directly carry out financial transaction such as deposit/withdrawal of cash using media such as a card or a bankbook.

Such an automated teller machine provides various financial services such as depositing or withdrawing a paper medium such as a bill or a check, checking a balance, and doing an account transfer, and the automated teller machine is provided with various independent modules such as a deposit/withdrawal apparatus, a card reader, and a bankbook updating machine in order to provide the financial services, in which the modules are electrically connected to a controller and thus controlled by the controller.

Such an automated teller machine includes a deposit/withdrawal apparatus for deposit/withdrawal transactions. As the conventional deposit/withdrawal apparatus, a pocket type which enables a user to put his or her hand in a bill storage space provided inside a shutter to insert or receive a bill when the shutter is opened has been mainly applied.

However, there is a problem in that the shutter is closed even though a user's hand is located inside the shutter while the user inserts the bill into the bill storage space provided inside the shutter or receives the loaded bill. When such a problem occurs, the user's hand may be injured by a force of a motor operating the shutter, and a load impact occurs as the shutter repeatedly and continuously performs the opening/closing operation even when the shutter is pressed by the user's hand to hinder the opening/closing operation, thereby causing the problem in that the life of the motor and the gear for performing the opening/closing operation of the shutter is shortened and frequent malfunction occurs.

In order to solve such a problem, Korean Patent No. 1,363,769 discloses a technique for controlling an operation of opening and closing a shutter after determining whether a user's hand enters by providing an optical sensor at a deposit/withdrawal portion.

In the prior art, an optical sensor module including a light emitting portion and a light receiving portion is provided on an inner lower portion and an outer upper portion of the shutter, respectively, and the optical sensor module determines whether the user's hand enters, such that the opening/closing operation of the shutter is performed.

On the other hand, in configuring the deposit/withdrawal apparatus of the ATM, a present type in which a tray on which a bill can be loaded moves to a front and a back of a bill insertion slot to receive or discharge a bill can be applied. In recent, a drive-through ATM which can use the ATM even in the state in which a customer gets into a vehicle is becoming common, and as a result, in order for a user to be able to conveniently deposit/withdraw cash or a check without stretching out his or her body and arm out of a vehicle, the preference of the ATM to which the present type is applied is increasing.

Such a present type deposit/withdrawal apparatus requires a shutter opening/closing control system for moving the tray, but when the method for determining whether a user's hand enters by using the conventional optical sensor is applied to the present type deposit/withdrawal apparatus, the light emitting unit for emitting an infrared ray and the light receiving unit for receiving the infrared ray emitted from the light emitting unit need to be installed so as to protrude further forward than the tray due to the tray moving to a front and a back of the bill insertion slot, such that there is a problem in that the overall structure of the deposit/withdrawal apparatus is complicated and the installation cost thereof is increased.

SUMMARY

The present disclosure has been made to solve the above conventional problems. That is, various embodiments are directed to a deposit/withdrawal apparatus of an automated teller machine (ATM) which is a deposit/withdrawal apparatus of a present type ATM, and a control method thereof, in which the deposit/withdrawal apparatus is configured to a tray for loading a bill, a clamp for fixing a bill, a shutter for opening or closing an entrance of a bill, and a camera mounted at one side of a bill insertion slot through which the tray enters, to grasp an insertion situation of a bill from an image photographed by the camera, and to control operations of the tray, the clamp, and the shutter, thereby making it possible to effectively support the deposit/withdrawal transaction with a simple structure using the camera.

As a technical idea for achieving the above object, various embodiments are directed to a deposit/withdrawal apparatus of an automated teller machine which is configured to include a case which forms a bill insertion slot through which a bill is inserted; a camera which is installed at one side of the case to photograph a front of the bill insertion slot; a shutter which is provided in the case to open/close the bill insertion slot; a tray which has a bill loading space provided at an upper part thereof and is provided to be movable to a front and a back of the bill insertion slot; and a clamp which prevents the bill loaded into the tray from being separated, and is configured to grasp an insertion situation of a bill and a location where a user's hand is placed, from an image photographed by the camera and to control operations of the tray, the clamp, and the shutter based on the grasped information.

DETAILED DESCRIPTION

The present disclosure may be variously modified and have several forms. Therefore, specific exemplary embodiments of the present disclosure will be illustrated in the accompanying drawings and be described in detail in the detailed description.

However, it is to be understood that the present disclosure is not limited to the specific exemplary embodiments, but includes all modifications, equivalents, and substitutions included in the spirit and the scope of the present disclosure. Terms such as 'first', 'second', or the like, may be used to describe various components, but these components are not to be construed as being limited to these terms. The terms are used only to differentiate one component from other components. For example, the 'first' component may be named the 'second' component, and vice versa, without departing from the scope of the present disclosure.

Terms used in the present specification are used only for describing specific embodiments of the present disclosure, and do not intend to limit the present disclosure. Singular forms used herein are intended to include plural forms unless context explicitly indicates otherwise. It is to be understood that the terms "comprises/includes" or "have" used in this specification or any other variation thereof specify the presence of stated features, numerals, steps, operations, components, parts, or a combination thereof, but do not preclude the presence or addition of one or more other features, numerals, steps, operations, components, parts, or a combination thereof.

Hereinafter, preferred embodiments of the present disclosure will be described in detail with reference to the accompanying drawings.

Figure 1:
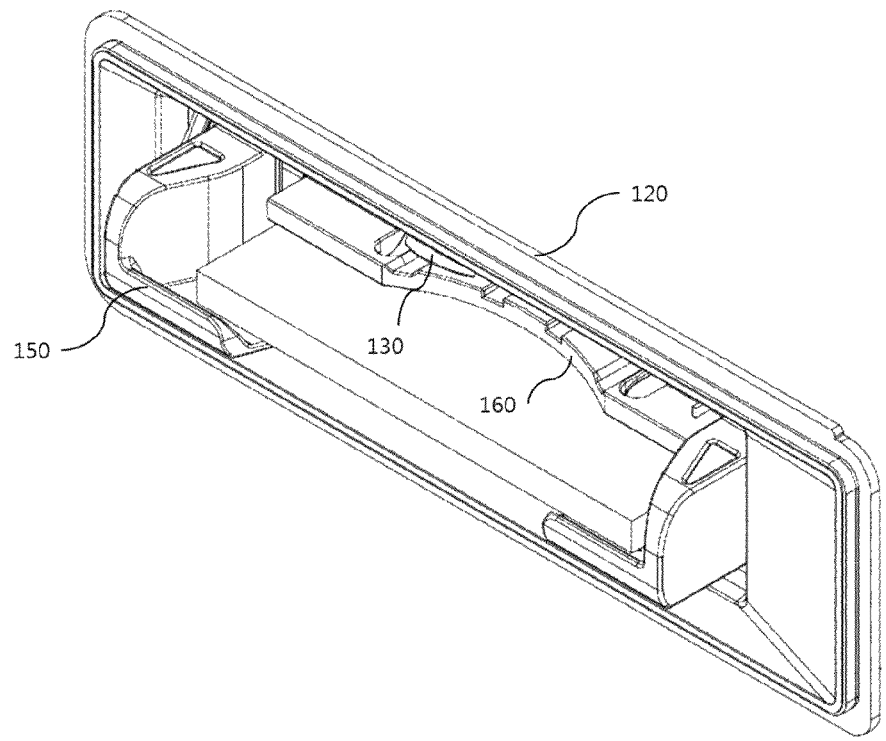
FIG. 1 is a perspective view schematically illustrating an appearance of a deposit/withdrawal apparatus according to an embodiment of the present disclosure.
Figure 2:
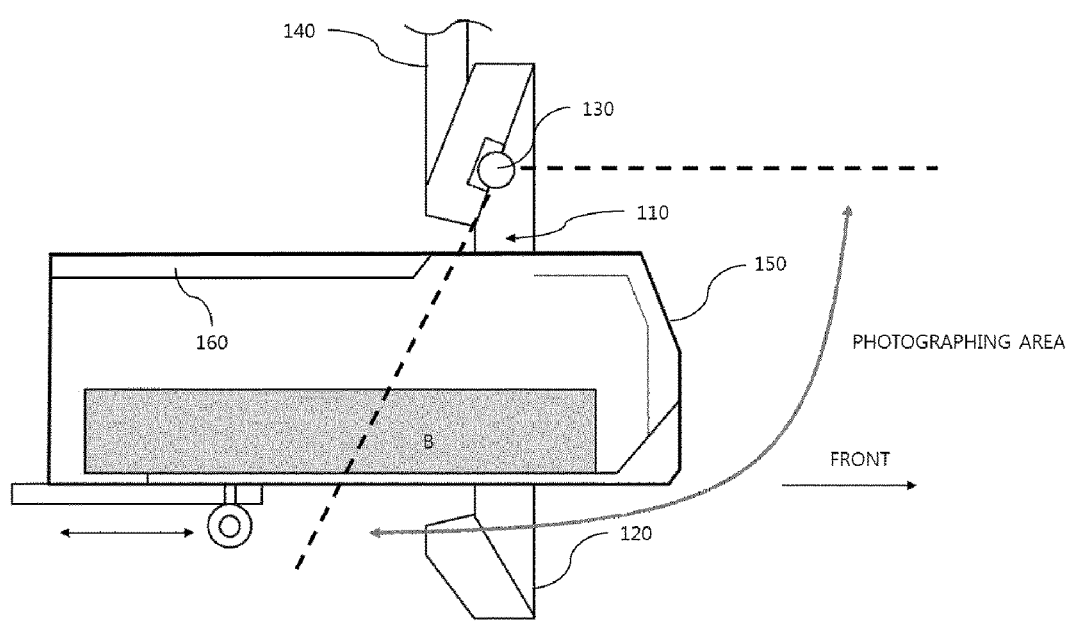
FIG. 2 is a cross-sectional view illustrating a state in which a camera is installed in a deposit/withdrawal apparatus according to an embodiment of the present disclosure.
Figure 3:
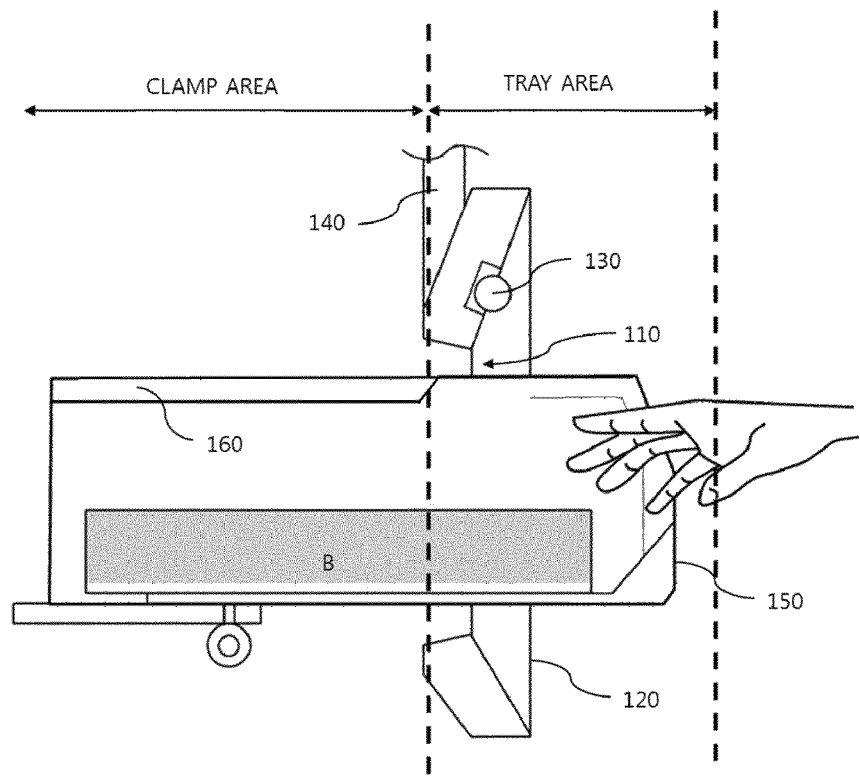
FIGS. 3 and 4 are diagrams for describing an example of a preset reference area according to an embodiment of the present disclosure.
Figure 4:
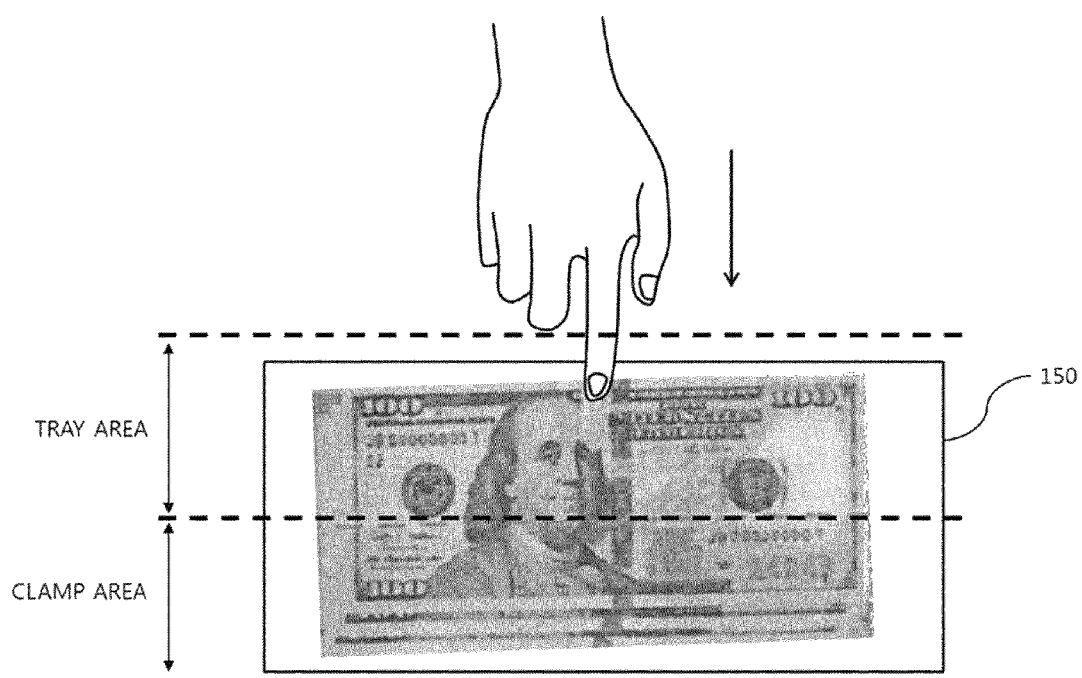

FIG. 1 is a perspective view schematically illustrating an appearance of a deposit/withdrawal apparatus according to an embodiment of the present disclosure, FIG. 2 is a cross-sectional view illustrating a state in which a camera is installed in a deposit/withdrawal apparatus according to an embodiment of the present disclosure, and FIGS. 3 and 4 are diagrams for describing an example of a preset reference area according to an embodiment of the present disclosure.

In general, the automated teller machine is provided with a deposit/withdrawal apparatus. The deposit/withdrawal apparatus performs a function of receiving a bill from a user when the user requests a deposit transaction or withdrawing a bill corresponding to an amount of money when the user requests a withdrawal transaction. In the present disclosure, the deposit/withdrawal apparatus has a concept which includes both a bill deposit/withdrawal for depositing/withdrawing cash, and a check deposit/withdrawal for depositing/withdrawing a check.

The deposit/withdrawal apparatus according to the present disclosure is constituted by a present type in which a bill is inserted or discharged through a forward and backward movement of a tray for loading a bill. To this end, as illustrated in FIGS. 1 and 2, the deposit/withdrawal apparatus according to the present disclosure is configured to include a case 120 which forms a bill insertion slot 110 through which a bill is inserted; a camera 130 which is installed at one side of the case 120 to photograph a front of the bill insertion slot 110; a shutter 140 which is provided in the case 120 to open/close the bill insertion slot 110; a tray 150 which has a bill loading space provided at an upper part thereof and is provided to be movable to a front and a back of the bill insertion slot 110; and a clamp 160 which prevents the bill loaded into the tray 150 from being separated. In addition, the components are electrically connected to a controller (not illustrated) which controls the overall operation of the ATM and thus controlled by the controller.

Therefore, the present disclosure is configured to grasp an insertion situation of a bill based on an image photographed by the camera 130 to control the operations of the tray 150, the clamp 160, and the shutter 140, which makes it possible to prevent an accident that a user's hand is pressed or caught by the clamp 160 or the shutter 140, and to determine an alignment state of bills during a deposit operation and checking whether or not the non-received bills are present during a withdrawal operation to inform the user of the presence of the non-received bills, which makes it possible to effectively support the deposit/withdrawal transaction with the simple structure using the camera.

The camera 130 according to the present disclosure photographs a front of the bill insertion slot 110 while the shutter 140 is opened and the transaction is made, and transmits the photographed image to the controller. In the present disclosure, as illustrated in FIGS. 1 and 2, the camera 130 is disposed at an upper center of a front surface of the case 120 which forms the bill insertion slot 110. However, the present disclosure is not limited thereto, and it is obvious that the camera can be installed at any location around the case including the left and right sides of the front surface of the case as long as the camera can photograph the front of the bill insertion slot 110. At this time, as illustrated in FIGS. 3 and 4, it is preferable that the camera 130 has a clamp area in which the clamp 160 seated on a bill loaded into the upper part of the tray 150 in a state in which the tray 150 protrudes toward the front of the bill insertion slot 110 may be located and a photographing area including a tray area so as to check that a user's hand is completely out of the tray.

The controller opens the shutter 140 to allow the tray 150 to protrude toward the front of the bill insertion slot 110 when receiving the deposit/withdrawal request from a user, and analyzes the image received through the camera 130 to determine whether an insertion of a bill that a user wants to deposit is inserted or a reception of a bill that a user wants to withdraw is completed. Only when it is determined that a user has completed a deposit/withdrawal operation, the controller controls the respective operations of the tray 150, the clamp 160, and the shutter 140.

That is, when receiving the deposit request from the user, the controller opens the shutter 140 to allow the tray 150 to protrude toward the front of the bill insertion slot 110, and at the same time, operates the camera 130 to photograph the front of the bill insertion slot 110 while the shutter 140 is opened so that the transaction is made, and analyzes an image transmitted from the camera 130 to detect a current location of a user's hand. At this time, as illustrated in FIGS. 3 and 4, based on the location of the clamp 160 seated on the bill loaded into the upper part of the tray 150 in the state in which the tray 150 protrudes forward, when the user's hand is detected within the clamp area, the controller determines that the user is still performing the deposit operation, and when the user's hand is detected beyond the clamp area, the controller determines that the user has completed the deposit operation, and seats the clamp 160 on the tray 150. After the clamp is seated on the tray, as illustrated in FIGS. 3 and 4, based on the location of the tray in the state in which the tray protrudes toward the front of the bill insertion slot, the controller determines whether the user's hand is located beyond the clamp area. When the user's hand is completely out of the tray area, the controller transfers the tray 150 to the back of the bill insertion slot 110 and then closes the shutter 140 to close the bill insertion slot 110.

In addition, when receiving the withdrawal request from the user, the controller opens the shutter 140 to allow the tray 150, having the clamp 160 and the withdrawn bill seated thereon, to protrude toward the front of the bill insertion slot 110, and at the same time, operates the camera 130 to photograph the front of the bill insertion slot 110. At this time, when the user's hand is detected within the clamp area, the controller determines that the user is still performing the withdrawal operation. When the user's hand is completely out of the tray area, the controller transfers the tray to the back of the bill insertion slot and then closes the shutter to close the bill insertion slot.

On the other hand, the controller keeps monitoring the location of the user's hand by the camera even while the clamp is seated, the tray is transferred backwards, and the shutter is closed and preferably stops the operations of the tray, the clamp, and the shutter for safety when it is detected that the user's hand enters the clamp area or the tray area. In addition, when the current location of the user's hand is located within the clamp area or the tray area even after a predetermined time, a message informing the user of such a fact may be displayed on the automated teller machine together with an alarm or output as a voice.

In the present disclosure, the method of analyzing the image transmitted from the camera 130 and grasping the location of the user's hand can be performed in various ways. A user's skin color area may be detected from the image transmitted from the camera to track the location of the user's hand, and boundary areas may be detected from an image data acquired from the camera to track the location of the user's hand by means of a hand shape extraction and a feature extraction.

As described above, the present disclosure sets a reference area in the photographed area and sequentially controls the operations of the clamp 160, the tray 150, and the shutter 140 only when the user's hand is not detected within the reference area, thereby making it possible to prevent the accident that the user's hand is pressed or caught by the clamp or the shutter.

In addition, the controller checks the alignment state of bills during the deposit operation based on the image photographed through the camera 130, and when the bills are abnormally disposed, the controller displays a message informing the user of such a fact, on the automated teller machine together with an alarm, such that the user can normally realign bills.

That is, after determining that the user has completed the deposit operation and seating the clamp 160 on the tray 150, the controller checks the alignment state of bills based on the image photographed by the camera 130 to request the user to realign bills when the bills are abnormally disposed beyond the preset reference range. At this time, since the clamp 160 seated on the tray 150 is slightly placed on an upper surface of a bill, the user can align the bills by pushing the bills, which are abnormally disposed, backwards or collecting the bills again.

As such, when the user loads bills into the tray during the deposit operation, the controller checks whether the current location of the user's hand is located beyond the clamp area based on the image photographed by the camera, to allow the clamp to be seated on bills loaded into the tray. Then, the controller checks the alignment state of bills in the state in which the clamp is seated, and when the bills are abnormally disposed, the controller requests the user to realign the bills, and when the controller checks that the bills are completely realigned and the current location of the user's hand is beyond the tray area, the controller transfers the tray to the back of the bill insertion slot and then closes the shutter to close the bill insertion slot.

Accordingly, the present disclosure may prevent jamming of bills, improper loading of bills, and poor recognition of bills through the alignment of bills to be deposited, and prevent the occurrence of the case in which the user checks the alignment state of bills too late to suddenly put his or her hand into the tray.

In addition, when the non-received bills are present at the upper part of the tray even after a predetermined time when the user can receive money loaded into the tray lapses during the withdrawal operation based on the image photographed by the camera, the controller displays the message, informing the user of such a fact, on the automated teller machine together with an alarm, thereby making it possible to request the user to receive the non-received bills again.

Figure 5:
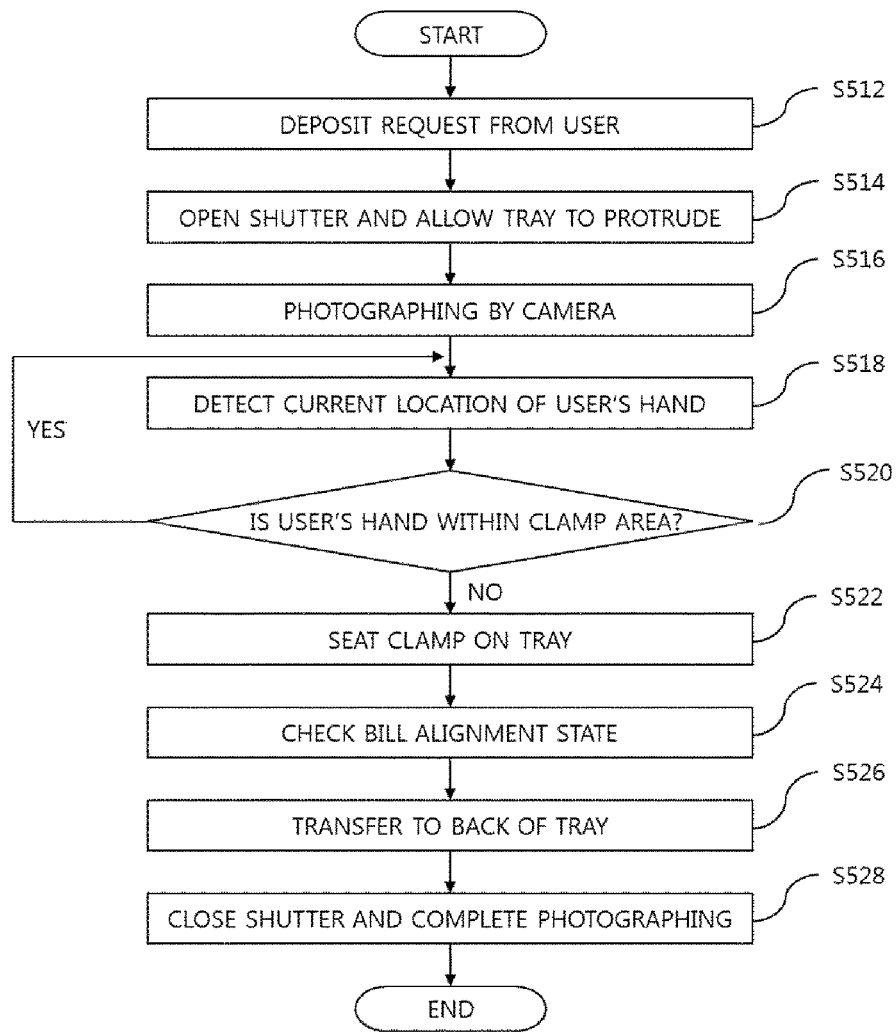
FIG. 5 is a flow chart illustrating a control method of a deposit/withdrawal apparatus according to an embodiment of the present disclosure.

FIG. 5 is a flow chart illustrating a control method of a deposit/withdrawal apparatus according to an embodiment of the present disclosure.

As illustrated in FIG. 5, when receiving the deposit request from the user (S512), the controller opens the shutter to allow the tray to protrude toward the front of the bill insertion slot (S514), and at the same time, operates the camera to photograph the front of the bill insertion slot while the shutter is opened so that the transaction is made (S516).

Next, when the user loads bills to be deposited into the tray, the controller analyzes the image transmitted from the camera to detect the current position of the user's hand (S518).

At this time, the controller grasps the current position of the user's hand detected by analyzing the image transmitted from the camera. When the controller determines that the user's hand is located within the clamp area in which the clamp can be seated on the tray in the state in which the tray protrudes forward, the controller determines that the user is still inserting bills to be deposited. On the other hand, when the controller determines that the user's hand is located beyond the clamp area (S520), the controller determines that the user has completely inserted bills to be deposited, and then seats the clamp on the tray to fix the bills loaded into the tray (S522).

Next, the controller checks the alignment state of the bills which the user loads into the tray for the deposit operation, based on the image photographed by the camera (S524), and when the bills are abnormally disposed, the controller displays a message, informing the user of such a fact, on an automated teller machine together with an alarm, such that the user may normally realign the bills.

Thereafter, when a deposit check command indicating that the bills has been completed inserted is inputted by the user, after checking whether the current location of the user's hand is located beyond the tray area, the controller transfers the tray to the back of the bill insertion slot (S526), closes the shutter to close the bill insertion slot, and then completes the camera photographing (S528).

Accordingly, the present disclosure controls the operations of the clamp, the tray, and the shutter only when the user's hand is not detected within the reference area photographed by the camera, thereby making it possible to prevent the accident that the user's hand is pressed or caught by the clamp or the shutter, and determines the alignment state of bills during the deposit operation with the simple structure using the camera to inform the user of the determined alignment state, thereby making it possible to effectively support the deposit transaction.

According to the deposit/withdrawal apparatus of the ATM and the control method thereof according to the present disclosure, the operations of the clamp, the tray, and the shutter are controlled only when the user's hand is not detected within the reference area photographed by the camera, thereby making it possible to prevent the accident that the user's hand is pressed or caught by the clamp or the shutter.

In addition, with the simple structure using the camera, it is possible to determine the alignment state of bills during the deposit operation and check whether or not the non-received bills are present during the withdrawal operation to inform the user of the alignment state and the presence of the non-received bills, thereby making it possible to effectively support the deposit/withdrawal transaction.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

The invention claimed is:

1. A deposit/withdrawal apparatus of a present type automated teller machine, comprising:
    a case formed with a bill insertion slot through which a bill is inserted;
    a camera which is installed at one side of the case to photograph a front side of the bill insertion slot;
    a shutter which is provided in the case to open or close the bill insertion slot;
    a tray having a bill loading space provided at an upper part thereof and movable to the front side or a back side of the bill insertion slot; and
    a clamp configured to prevent a bill loaded into the tray from being separated from the tray,
    wherein the deposit/withdrawal apparatus is configured to determine an insertion state of a bill and a location where a user's hand is placed from an image photographed by the camera, and to control operations of the tray, the clamp, and the shutter based on the determined state of the bill and the location where the user's hand is placed,
    wherein the clamp is operated to be seated onto the bill loaded into the upper part of the tray when the bill is loaded onto the upper part of the tray and the user's hand is outside a preset first reference area based on the image photographed by the camera, and
    wherein the preset first reference area is an area where the clamp is seated on the bill loaded onto the upper part of the tray when the tray moves toward the front side of the bill insertion slot.

2. The deposit/withdrawal apparatus of claim 1, wherein the camera is mounted at an upper center of a front surface of the case.

3. The deposit/withdrawal apparatus of claim 1, wherein the tray is moved to the back side of the bill insertion slot and the shutter is closed when the location of the user's hand is outside a preset second reference area with the clamp seated on the bill loaded into the upper part of the tray.

4. The deposit/withdrawal apparatus of claim 3, wherein the preset second reference area includes a tray area moving toward the front side of the bill insertion slot and an upper area of the tray.

5. The deposit/withdrawal apparatus of claim 1, wherein the deposit/withdrawal apparatus determines an alignment state of the bill loaded into the upper part of the tray during a bill deposit operation, and presents the bill alignment request message to the user together with an alarm when the alignment state is outside a preset reference range.

6. The deposit/withdrawal apparatus of claim 1, wherein a bill receipt request message is presented to the user together with an alarm when a bill to be withdrawn remains loaded in the upper part of the tray after a predetermined time during a bill withdrawal operation.

7. A control method of a deposit/withdrawal apparatus of an automated teller machine, the control method comprising:
    photographing an image a front side of a bill insertion slot of the deposit/withdrawal apparatus by a camera installed at one side of a case of the deposit/withdrawal apparatus formed with a bill insertion slot;
    determining an insertion state of a bill and a location where a user's hand is placed from the image photographed by the camera; and
    controlling operations of a tray for loading the bill, a clamp for securing the bill onto the tray, and a shutter for opening or closing an entrance of the bill insertion slot based on the determined insertion state of the bill and the location where the user's hand is placed, controlling the operations comprising:
        operating the clamp to be seated on the bill loaded on an upper part of the tray when the bill is loaded onto the upper part of the tray and the location of the user's hand is determined, based on the image photographed by the camera, to be outside an area in which the clamp is seated on the bill loaded at the upper part of the tray with the tray moving toward a front side of the bill insertion slot.

8. The control method of claim 7, wherein controlling the operations further comprises: moving the tray to a back of the bill insertion slot and closing the shutter when the location of the user's hand is determined to be outside a tray area in which the tray moves toward the front side of the bill insertion slot with the clamp seated on the bill loaded on the upper part of the tray.

9. The control method of claim 7, wherein controlling the operations further comprises: presenting a bill alignment request message to the user together with an alarm when an alignment state of the bill loaded into the upper part of the tray is determined to be outside a preset reference range.

10. The control method of claim 7, wherein controlling the operations further comprises: presenting a bill reception request message to the user together with an alarm when a bill to be withdrawn remains loaded in the upper part of the tray after a predetermined time during a bill withdrawal operation.

\* \* \* \* \*